(12) United States Patent
Adldinger et al.

(10) Patent No.: US 8,910,383 B2
(45) Date of Patent: Dec. 16, 2014

(54) METHOD AND MACHINE TOOL FOR MANUFACTURING EXHAUST GAS CLEANING DEVICES

(75) Inventors: Martin Adldinger, Holzheim (DE); Thorsten Keesser, Augsburg (DE); Marco Ranalli, Augsburg (DE)

(73) Assignee: Emcon Technologies Germany (Augsburg) GmbH, Augsburg (DE)

( * ) Notice: Subject to any disclaimer, the term of this patent is extended or adjusted under 35 U.S.C. 154(b) by 1127 days.

(21) Appl. No.: 12/719,062

(22) Filed: Mar. 8, 2010

(65) Prior Publication Data
US 2010/0225037 A1 Sep. 9, 2010

(30) Foreign Application Priority Data
Mar. 9, 2009 (KR) .......................... 10-2009-012348

(51) Int. Cl.
*B23P 15/16* (2006.01)
*B21D 53/02* (2006.01)
*B23P 11/00* (2006.01)
*B23P 11/02* (2006.01)

(52) U.S. Cl.
CPC ............... *B23P 11/025* (2013.01); *B21D 53/02* (2013.01); *B23P 11/005* (2013.01); *B23P 2700/03* (2013.01); *F01N 2350/00* (2013.01)
USPC ........................................................ 29/896.62

(58) Field of Classification Search
USPC .............................................. 29/896.62, 890
See application file for complete search history.

(56) References Cited

U.S. PATENT DOCUMENTS

| | | | |
|---|---|---|---|
| 6,908,595 B1* | 6/2005 | Biel et al. ....................... | 422/179 |
| 2003/0140495 A1* | 7/2003 | Hardesty et al. ................ | 29/890 |
| 2004/0255459 A1* | 12/2004 | Alles et al. ..................... | 29/890 |

OTHER PUBLICATIONS http://www.azom.com/article.aspx?ArticleID=1175.*

* cited by examiner

*Primary Examiner* — Moshe Wilensky
(74) *Attorney, Agent, or Firm* — Carlson, Gaskey & Olds, PC

(57) ABSTRACT

A machine tool for manufacturing exhaust gas cleaning devices, in particular diesel particulate filters and catalysts that have a housing and a gas-traversed insert clamped in the housing, comprises at least one tool, in which the insert is clamped in the housing. A heating device that heats the housing is integrated in the tool. In a method for manufacturing exhaust gas cleaning devices, the heated housing is plastically deformed in a machine tool, and the insert is inserted into the housing.

26 Claims, 1 Drawing Sheet

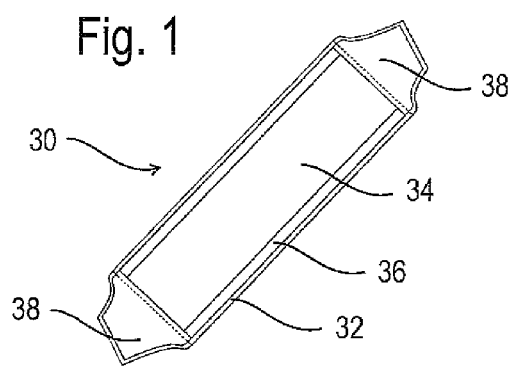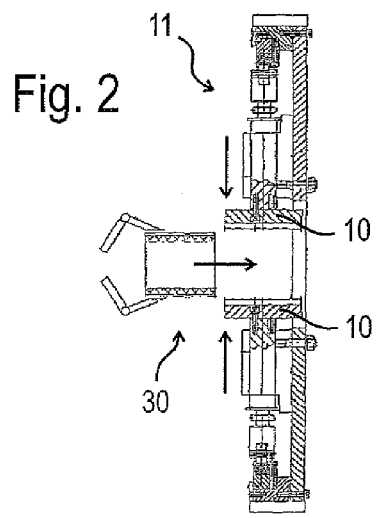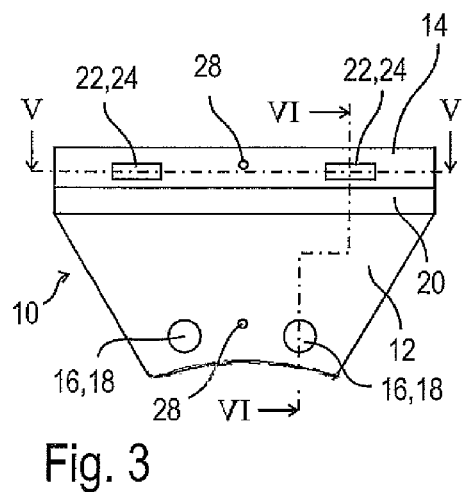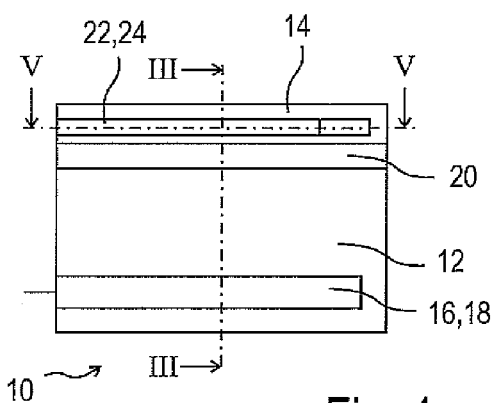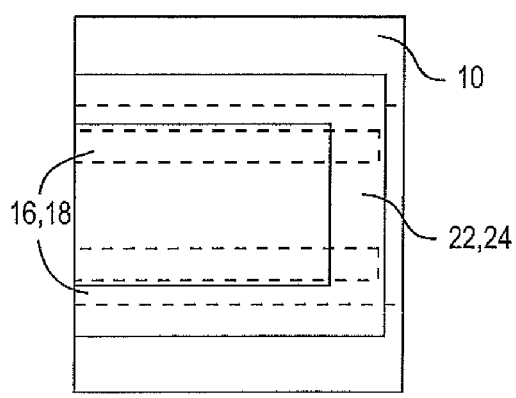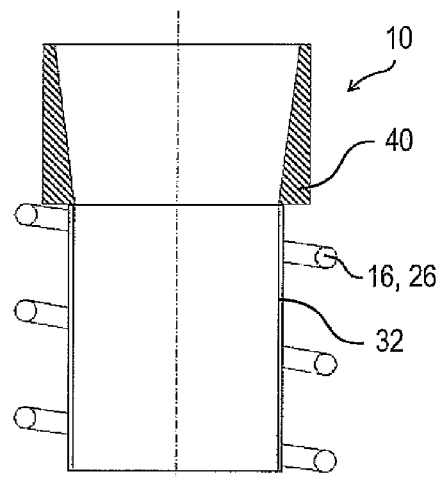

METHOD AND MACHINE TOOL FOR MANUFACTURING EXHAUST GAS CLEANING DEVICES

RELATED APPLICATION

This application claims priority to DE 10 2009 012 348.2, which was filed Mar. 9, 2009.

FIELD OF THE INVENTION

This invention relates to a method and a machine tool for manufacturing exhaust gas cleaning devices, in particular diesel particulate filters or catalysts.

BACKGROUND

In such devices, inserts which are very sensitive to radial pressure and which are chiefly axially traversed ceramic substrates, are held in an outer housing by radial clamping. Between the ceramic insert and the outer housing, an insulation mat is arranged, which forms an elastic element. Various methods exist for so-called "canning," i.e. for introducing or arranging the insert into the housing. Some of these methods will be explained below.

A first method for manufacturing the device is the so-called "calibrating" or "shrinking" method, where the insert with the insulation mat is put into an oversized, peripherally closed tube referred to as a jacket, and subsequently the unit obtained is placed in a tool. The tool is provided with numerous radially inwardly movable pressure jaws. When the pressure jaws are moved radially inwards, they plastically deform the jacket to such an extent that the insert is clamped in the jacket.

Another method for manufacturing the device is the so-called "stuffing" method, where the outer housing is first brought to the desired outer radius; and subsequently, the insert wrapped with the insulation mat is placed or introduced into the outer housing through a funnel-shaped tool.

Other methods include the so-called "wrapping" method, wherein a sheet metal is wrapped around the insert and welded in the desired end position in the overlap region of the sheet-metal edges, and the so-called "clamping" method, in which the housing is divided into two half-shells between which the insert is clamped.

An important characteristic of the insulation mats is the gap bulk density (GBD). It designates the compression of a certain mass of the material in the gap between insert and housing. Due to the resilience of the housing material, a lower GBD can be obtained by the canning method, so that the insulation mats must be compressed more during the canning method. A thermal expansion of the housing and hence a lower GBD in operation of the exhaust gas cleaning device must be compensated during the manufacture by a correspondingly greater compression of the housing and the insulation mat in the cold condition.

One objective is to create a machine tool for manufacturing an exhaust gas cleaning device and to provide a method for manufacturing exhaust gas cleaning devices by which the inserts are very safely held in the housing.

SUMMARY

A machine tool for manufacturing exhaust gas cleaning devices, in particular diesel particulate filters and catalysts, includes a housing and a gas-traversed insert clamped in the housing. The machine tool includes at least one tool in which the insert is clamped in the housing, wherein a heating device for heating the housing is integrated in the tool. In this way, it is possible to directly heat the housing in the machine tool during the canning method, whereby the material properties of the components for the manufacturing method are positively changed. For example, the resilience of the housing material is reduced, and the housing is thermally expanded during the manufacturing method, whereby the insert and/or insulation mat must be compressed to a smaller extent. In addition, the required plastic deformation of the housing is smaller than in the prior art.

In one example, the heating device includes at least one electric heating element. This provides for a simple construction of the heating device.

The heating device can include at least one induction element. Thus, induced eddy currents provide for a direct heating of the housing material.

Alternatively, it is possible that heating ducts are provided in the tool, through which a heating fluid flows. A heating fluid provides for heating a plurality of tools via one central heating device.

If the tool itself is heated, the housing can be heated selectively by contact with the tool.

In one example, the tool includes a thermal insulation of the heating device. In this way, the housing and the part of the tool adjacent to the housing can be heated, while other regions of the machine tool are not heated due to the thermal insulation.

It is possible that cooling ducts are provided in the tool, through which a cooling fluid flows. Thus, a plurality of tools can also be cooled via one central cooling device.

In accordance with a preferred embodiment, the tool is a calibrating tool for reducing the outside dimensions of the housing.

In accordance with another preferred embodiment, the tool is a stuffing tool in which the insert is stuffed into the heated housing. Here as well, the load acting on the insert during the manufacture is reduced.

Alternatively, the tool is a wrapping tool in which the insert is wrapped with heated sheet metal.

In one example, the heating device is constructed such that a tool-side housing receptacle is heated to temperatures of at least 150° C. The elevated temperature facilitates forming of the housing.

The heating device can be constructed such that a housing receptacle is maximally heated to temperatures of 630° C., more specifically 500° C. At these temperatures, the housing has sufficient mechanical stability, without requiring additional supporting mechanisms.

In one example, the heating device is constructed such that a housing receptacle is heated to temperatures between 300° C. and 500° C., in particular between 400° C. and 500° C. This temperature range provides for easier forming of the housing with a sufficient mechanical stability at the same time.

It is possible that temperature sensors are provided in the tool. This provides for a control or regulation of the temperature of the housing, and of the housing receptacle, and provides a protection against overheating of the machine tool.

This invention also relates to a method for manufacturing exhaust gas cleaning devices, in particular diesel particulate filters and catalysts, which include a housing and a gas-traversed insert clamped in the housing. The housing is formed in a machine tool, the insert is introduced into the housing, and the housing is heated in the machine tool. By heating the housing, the material properties of the housing are changed, for example the resilience of the material is reduced. Another advantage of heating during the manufacturing method is the thermal expansion of the housing, whereby for example the insert and/or insulation mat must be compressed to a smaller extent.

In one example, the housing is heated to at least 150° C. In this way, a sufficient change in the material properties for improving the manufacturing method becomes possible.

Advantageously, the housing is heated to not more than 630° C., more specifically not more than 500° C.

In accordance with a preferred method variant, the housing is heated to temperatures between 300° C. and 500° C., more specifically between 400° C. and 500° C. This provides for a better formability with sufficient strength of the housing.

In accordance with a further variant, an insulation mat containing a binder is clamped between insert and housing. The temperature of the heated housing liquefies the binder in the insulation mat. By liquefying the binder, the friction between housing and insert is reduced, whereby less shear forces are introduced into the insulation mat.

Heating of the housing can be effected by induction.

In one example, the method is, e.g. a stuffing method, with the following method steps. The insert is wrapped with an insulation mat, the housing is heated, and the wrapped insert is introduced into the heated housing. Due to the expansion of the housing, the stuffing method is simplified, since the wrapped insert must only be reduced to the diameter of the expanded housing.

Alternatively, the insert might also be wrapped by a heated sheet metal.

The insert can be measured at the beginning of the method and the housing diameter can be reduced or adapted to the respective insert.

In one example, the housing is cooled in a controlled manner after introducing the wrapped insert.

In accordance with an alternative method variant, the method is a calibrating method with the following method steps. The insert is wrapped with an insulation mat, the housing is heated, the wrapped insert is introduced into the heated housing, and the outside dimensions of the housing are reduced. Due to the thermal expansion of the hot housing, the required outside dimensions of the calibrated housing are greater than in a cold housing, whereby the calibrating method is simplified and the pressure load acting on the insert is reduced. The reduced resilience of the material of the hot housing provides a further simplification of the method.

The insert can be measured at the beginning of the method, whereby the outside dimensions of the housing are specifically reduced to the respective insert.

In one example, heating the housing and reducing the outside dimensions of the housing are performed by a hot tool. Thus, heating the housing and reducing the outside dimensions of the housing substantially can be performed in the same method step.

These and other features of the present invention can be best understood from the following specification and drawings, the following of which is a brief description.

BRIEF DESCRIPTION OF THE DRAWINGS

FIG. 1 shows a schematic view of an exhaust gas cleaning device.

FIG. 2 shows a machine tool in accordance with a first embodiment of the invention.

FIG. 3 shows a sectional view through a tool of the machine tool of FIG. 2.

FIG. 4 shows a sectional view through the tool along line IV-IV in FIG. 3.

FIG. 5 shows a sectional view through the tool along line V-V in FIG. 3.

FIG. 6 shows a part of a machine tool in accordance with a second embodiment of the invention.

DETAILED DESCRIPTION

FIG. 1 shows an exhaust gas cleaning device 30, for example a diesel particulate filter or a catalyst, which includes a cylindrical housing 32 and a gas-traversed insert 34 clamped in the housing 32, for example a ceramic monolith. Between the insert 34 and the housing 32 an insulation mat 36 is provided, which forms an elastic element. At each axial end of the insert 34, funnels 38 are attached to the housing 32 as an inlet or outlet, or the funnels 38 are integrally formed with the same.

FIG. 2 shows a machine tool 11 in accordance with a first embodiment of the invention with a plurality of tools 10 in the form of jaws which can be moved by the machine tool 11. The tools 10 form a housing receptacle for the housing 32 of the exhaust gas cleaning device 30. The illustrated machine tool 11 is a calibrating machine with tools 10 constituting pressure jaws which in radial direction press on the exhaust gas cleaning device 30 introduced into the machine tool 11 and thus reduce the outside dimensions of the housing 32.

A tool 10 of the machine tool 11 shown in FIG. 2 is illustrated in FIG. 3 to FIG. 5. The tool 10 has a side 12 facing the housing 32 (the workpiece) and a side 14 facing the machine tool 11. On the side 12 facing the housing 32 a heating device 16 is integrated in the tool 10. The heating device 16 consists of two electric heating elements 18 oriented parallel to each other. Alternatively, it is possible that heating ducts are provided in the tool 10, through which a heating fluid flows.

The heating device 16 is constructed such that, for example due to the number and arrangement of the electric heating elements 18, the tool 10 is uniformly heated on the side 12 facing the housing 32.

It is also possible that the heating device 16 includes an induction element by which the housing 32 is directly heated by induction.

Between the side 14 facing the machine tool 11 and the side 12 of the tool 10 facing the housing 32 a thermal insulation 20 is provided. The heating device 16 only heats the part of the tool 10 directly engaging the housing 32, while other components of the machine tool 11 are isolated from the heating device 16.

An optional cooling device 22 on the side 14 of the tool 10 facing the machine tool 11 includes a plurality of cooling ducts 24, through which a cooling fluid flows. The cooling device 22 is provided to maintain the temperature of the machine tool 11, independent of the temperature of the housing 32 determined by the heating device 16, in a certain range which ensures an optimum function of the machine tool 11.

A first temperature sensor 28 is provided on the side 12 of the tool 10 facing the housing 32. This temperature sensor 28 serves the temperature control of the tool 10 and hence of the contact surface for the housing 32. A further temperature sensor 28 is provided on the side 14 of the tool 10 facing the machine tool 11, wherein this temperature sensor 28 serves the control of the cooling device 22 and/or as protection against overheating of the machine tool 11.

It is of course also possible that other temperature sensors are provided, for example those which directly measure the temperature of the housing 32.

FIG. 6 shows a part of a machine tool 11 in accordance with a second embodiment of the invention, wherein the tool 10 is a stuffing tool by which the insert 34 is stuffed into the housing 32. A heating device 16 consists of an induction element 26 which is arranged around the housing 32. A funnel-shaped tool part 40 is arranged at an axial end of the housing. The funnel-shaped tool part 40 and the induction element 26 form the housing receptacle of the tool 10.

In the illustrated embodiment, the heating device 16 serves to directly heat the housing 32 by induction. It is also possible that the heating device also heats the funnel-shaped tool part 40 to a specific temperature.

In the following, a method for manufacturing exhaust gas cleaning devices 30 will be explained with reference to FIGS. 1 to 6.

A first variant of the manufacturing method is the stuffing method. The insert 34 of the exhaust gas cleaning device 30 is measured at the beginning of the method, and the housing 32 is brought to the required dimensions, for example by a calibrating method. In this way, it is possible to compensate manufacturing tolerances of the insert 34.

In the following method step, the insert 34 is wrapped with an insulation mat 36. It is also possible to choose material and/or volume of the insulation mat 36, for example in dependence on the dimensions of the insert 34, to individually weigh the insulation mat or individually measure the unit of insulation mat 36 and insert 34.

The housing 32 is inserted in the tool 10 of the machine tool 11, wherein the housing 32 rests against the funnel-shaped tool part 40 with an axial end thereof and is surrounded by the induction element 26, as is shown in FIG. 6. The housing 32 is then heated by the induction element 26.

The insert 34 wrapped with the insulation mat 36 subsequently is introduced into the heated housing 32 through the funnel-shaped tool part 40. The insulation mat 36 surrounding the insert 34 is compressed by the funnel-shaped tool part 40 such that the diameter of the unit comprising the insert 34 and insulation mat 36 maximally corresponds to the inside dimensions of the housing 32 or is smaller than the same.

By heating the housing 32, the housing 32 is thermally expanded, whereby the inside dimensions of the housing 32 are increased, which simplifies introducing the wrapped insert 34.

During introduction of the insert 34, the housing 32 is heated to at least 150° C., whereby the binder in the insulation mat 36 is liquefied and the friction between insulation mat 36 and housing 32 is reduced.

After introducing the insert 34 into the housing 32, the exhaust gas cleaning device 30 is cooled, and the funnels 38 can be attached or molded to the housing 32.

The heating device 16 with the induction element 26 is controlled such that the temperature of the housing 32 is not more than 630° C. The housing 32 in one example is heated to a temperature between 300° C. and 500° C.

It is also possible that the housing 32 is heated already during the calibration of the empty housing 32 at the beginning of the method.

In accordance with a second method variant, the manufacture of the exhaust gas cleaning device 30 is effected by a calibrating method. The insert 34 is wrapped with the insulation mat 36. The housing 32, possibly together with the insert 34, is heated in the machine tool 11, with the dimensions of the housing 32 being larger than the wrapped insert 34.

In the following method step the outside dimensions of the housing 32 are reduced. The housing 32 is held in the machine tool 11 by a plurality of tools 10 constituting pressure jaws, and is heated by the heating devices 16 integrated in the tools 10. The temperature range of the heated housing 32 is similar to the stuffing method described above.

Due to the material and the thin walls of the housing 32, heating the housing 32 is effected very quickly upon contact with the hot tool 10, whereby heating the housing 32 and reducing the outside dimensions of the housing 32 substantially can be performed at the same time in the same method step.

In the calibrating method it is also possible that the insert 34 and/or the insulation mat 36 are measured at the beginning of the method, in order to correspondingly reduce the outside dimensions of the housing 32 adapted to the respective insert 34.

As an alternative to the above embodiments, a wrapping tool can also be used, in which the housing is placed around the insert 34 and contracted as a sheet metal part. In the contracted end position, the sheet metal then is welded along the edge, in order to create a closed cylinder. The tool shown in FIG. 2 can also be used as wrapping tool, in that the jaws 10 tightly close the sheet metal around the insert. The sheet metal then is welded within the tool.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for manufacturing exhaust gas cleaning devices including a housing and a gas-traversed insert clamped in the housing comprising the following steps:
   a. heating the housing in a machine tool;
   b. plastically deforming the heated housing in the machine tool;
   c. arranging the gas-traversed insert in the heated housing; and
   d. clamping an insulation mat including a binder between the gas-traversed insert and housing, wherein the temperature of the heated housing liquefies the binder in the insulation mat.

2. The method according to claim 1, wherein said method is a stuffing method, with the following method steps:
   wrapping the gas-traversed insert with an insulation mat, performing step (a) to provide a heated housing, and arranging the wrapped insert in the heated housing.

3. A method for manufacturing exhaust gas cleaning devices including a housing and a gas-traversed insert clamped in the housing comprising the following steps:
   heating the housing in a machine tool;
   plastically deforming the heated housing in the machine tool;
   arranging the gas-traversed insert in the heated housing; and
   wherein said method is a calibration method comprising the following method steps:
   wrapping the gas-traversed insert with an insulation mat to provide a wrapped insert;
   heating the housing in the machine tool to provide a heated housing;
   arranging the wrapped insert in the heated housing; and
   plastically deforming the heated housing in the machine tool by reducing outside dimensions of the housing.

4. The method according to claim 3, wherein the housing is heated to at least 150° C.

5. The method according to claim 3, wherein the housing is heated to not more than 630° C.

6. The method according to claim 3, wherein the housing is heated to temperatures between 300° C. and 500° C.

7. The method according to claim 3, wherein heating the housing is effected by induction.

8. The method according to claim 3, including inserting the gas-traversed insert into the housing while the housing is being heated to form an assembly.

9. The method according to claim 3, including cooling the assembly, and providing inlet and outlets to the housing to form a final exhaust gas cooling device.

10. The method according to claim 8, including wrapping a mat around the insert prior to step (c) to form a wrapped insert, and compressing the mat around the insert as the wrapped insert is being inserted into one end of the housing.

11. The method according to claim 10, wherein the machine tool includes a funnel part, and including resting the one end of the housing against the funnel part and introducing the wrapped insert into the one end of the housing through the funnel part.

12. The method according to claim 10, wherein the machine tool includes an induction element, and including surrounding the housing with the induction element prior to step (a).

13. The method according to claim 3, including wrapping a mat around the insert prior to step (c) to form a wrapped insert, and forming an inner dimension of the housing to be greater than an outer dimension of the wrapped insert prior to step (a).

14. The method according to claim 13, including heating the housing with the machine tool prior to inserting the wrapped insert into the housing, inserting the wrapped insert into the housing held by the machine tool after the housing has been heated to a desired temperature, and subsequently reducing an outer dimension of the housing to a desired final dimension.

15. The method according to claim 14, wherein the steps of heating the housing with the machine tool and reducing the outer dimension of the housing occur simultaneously.

16. The method according to claim 13, including inserting the wrapped insert into the housing, heating the housing and the wrapped insert with the machine tool, and reducing an outer dimension of the housing to a desired final dimension.

17. The method according to claim 16, wherein the steps of heating the housing with the machine tool and reducing the outer dimension of the housing occur simultaneously.

18. A method for manufacturing exhaust gas cleaning devices including a housing and a gas-traversed insert clamped in the housing comprising the following steps:
   a. wrapping the gas-traversed insert with an insulation mat to form a wrapped insert;
   b. staring to heat the housing in a machine tool to increase the temperature of the housing; and
   c. arranging the wrapped insert in the heated housing while the housing is heated in the machine tool.

19. The method according to claim 18, wherein the machine tool includes a funnel part, and including resting the one end of the housing against the funnel part and introducing the wrapped insert into the one end of the housing through the funnel part.

20. The method according to claim 19, wherein the machine tool includes an induction element, and including surrounding the housing with the induction element to heat the housing while the wrapped insert is inserted into the heated housing through the funnel part.

21. The method according to claim 18, including measuring an insert characteristic of the gas-traversed insert and bringing the housing to a desired dimension based on the insert characteristic prior to step (b), and wherein the desired dimension increases to a greater size during step (b).

22. The method according to claim 18, wherein the housing is heated to at least 150° C.

23. The method according to claim 18, wherein the housing is heated to not more than 630° C.

24. The method according to claim 18, wherein the housing is heated to temperatures between 300° C. and 500° C.

25. The method according to claim 18, wherein heating the housing is effected by induction.

26. The method according to claim 18, wherein the housing is heated to a first temperature during step (b) and wherein step (c) is performed at a second temperature that is equal to or less than the first temperature, the second temperature being at least 150° C.

* * * * *